E. Blunt. Jr,

Coffee Pot.

No. 83,686. Patented Nov. 3, 1868.

Witnesses,
C. C. Livings.
W. E. Dey

Inventor.
E. Blunt Jr.

United States Patent Office.

E. BLUNT, JR., OF NEW YORK, N. Y., ASSIGNOR TO HENRY P. NICHOLS, TRUSTEE.

Letters Patent No. 83,686, dated November 3, 1868.

---

IMPROVEMENT IN COFFEE-POTS.

---

The Schedule referred to in these Letters Patent and making part of the same.

---

*To all whom it may concern:*

Be it known that I, E. BLUNT, Jr., of the city and county of New York, in the State of New York, have invented certain new and useful Improvements in Coffee-Pots, which apparatus may be used also for making other decoctions; and I do hereby declare that the following is a full and exact description thereof.

Many efforts have been heretofore made to aid in determining the proper period for boiling coffee by the aid of a reservoir of water held at a higher level; and coffee-pots have been made with whistles for producing an audible sound by the escape of steam when the proper period approaches.

My invention combines the advantages due to several of these different constructions, and avoids much of the objection due to each.

I will first describe what I consider the best means of carrying out my invention, and will afterwards describe the points which I believe to be new therein.

The accompanying drawings form a part of this specification.

Figure 1:
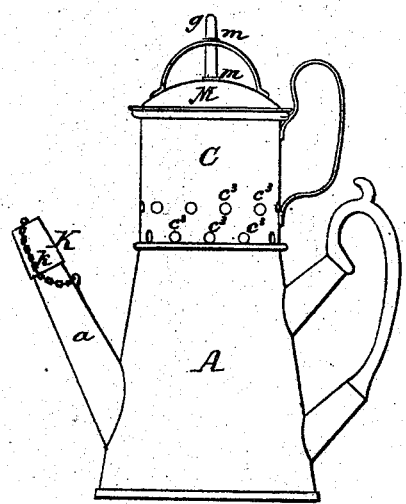
Figure 2:
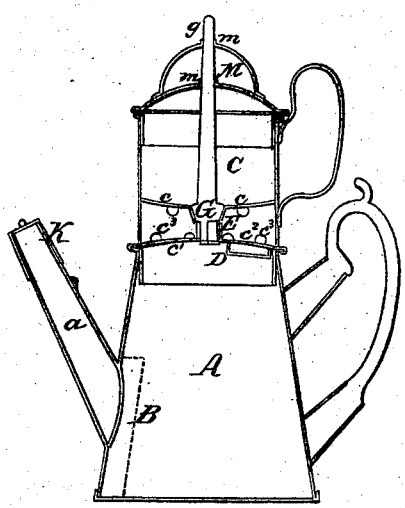
Figure 3:
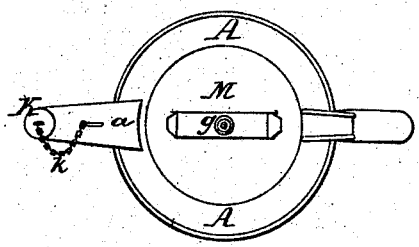

Figure 1 is a side elevation;
Figure 2 is a central vertical section; and
Figure 3 is a plan view.

Similar letters of reference indicate like parts in all the figures.

A is the base or main body of the coffee-pot, and $a$ is the nose. A strainer, B, is provided to cover the root of the nose, and by mounting it at a little distance within the body of the coffee-pot, instead of in close proximity to the nose, I obtain room for a large area of strainer. I make the strainer, thus arranged, of such area that it is not likely to be stopped by the fine grounds; or, if by any chance the coffee-grounds are pressed against the strainer, a very slight agitation of the fluid will remove the grounds. When the grounds are held against a very limited surface, they are liable to choke the passage and cause a great difference of level of the fluid on the two sides of the strainer; but when the strainer is large, as I arrange it, the difference of level is never great, and the grounds are, consequently, held against the strainer with a very gentle force. Moreover, by reason of the great extent of my strainer, there is almost certain to be a sufficient flow of the coffee or other decoction through the perforations therein, even though the grounds be allowed to remain thickly accumulated over its entire surface.

C is a separate vessel, adapted to contain cold water, and to be supported on the top of the body A. Its bottom proper, indicated by $c$, is supported at a little distance above the top of the coffee-pot A. Another bottom, $c^1$, is fixed a little distance below it, and a whistle, D, is fixed in a hole, $c^2$, therein, as represented. There is a passage from this whistle, D, through the side of the vessel C, between the top of the main body A and the true bottom $c$, as indicated by $c^3$. When steam forms in the main body A, it can flow out through the whistle D, and through the holes $c^2$ and $c^3$. When the steam forms with sufficient rapidity, this current will blow the whistle and produce a sound.

A short pipe, E, connects the true bottom, $c$, and the false bottom, $c^1$. This pipe is controlled by a tapering plug, G, which may be operated by the stem $g$, leading up through the cover M of the vessel C. It is guided by running through two bearings in this cover, as indicated by $m\ m'$.

Operation.

The coffee is introduced, with a portion of the water, into the body A. This water may be hot or cold at first, but I prefer to have it cold. The superior vessel C is then placed on the body A. The plug G is fitted tightly in the short tube E. The remainder of the water is placed in the superior vessel, and the cover M is applied. All the water may at this period be cold. The coffee-pot is now placed on the coals, or on the stove, or other heating-means; and when the water boils in the vessel A, the steam rises through the whistle D, and escapes through the space between the false bottom $c^1$ and true bottom $c$. The steam rising through the whistle, may, if preferred, be allowed to diffuse itself through the space between the true bottom and the false bottom, and to escape at all the apertures; but such a circulation of the steam tends to heat the water in the upper vessel C more rapidly than is desirable. I prefer, therefore, to provide a pipe, or small contracted passage, leading from the hole $c^2$ to one of the vents designated at $c^3$, and to allow the steam from whistle to escape through this passage alone, thus preserving a simple air-space between the true bottom and the false bottom, over a great portion of the space between them. The air in this space being a non-conductor, greatly retards the transmission of heat from the false bottom to the true bottom, and consequently preserves the water in the upper vessel at a low temperature, after the boiling has proceeded for a sufficient period.

When the steam issues rapidly, the whistle D produces a loud sound, thus calling the attention of the attendant, and the subsequent operations may be effected immediately, or after the lapse of such a period, say about a half minute, as may be found desirable to produce the best coffee. At such period the attendant raises the plug G by the stem $g$, and allows the cold water in the vessel C to descend. This cold water has the effect of settling the coffee, and its function of condensing a portion of the steam or aroma at this period may also be of some importance.

I provide a cover, K, held by the chain $k$, which serves to stop tightly the nose of the coffee-pot.

I am aware that the several devices, herein shown and described, when taken separately, are, of themselves, not new.

What I claim, is—

The combination of the vessels A and C, double partition $c\ c'$, valve and rod G, and whistle D, all constructed and operating substantially as herein shown and described.

E. BLUNT, JR.

Witnesses:
THOMAS D. STETSON,
CAMPBELL C. LIVINGS.